United States Patent [19]

Hoffert et al.

[11] 4,359,326
[45] Nov. 16, 1982

[54] FLUIDIZED BED REACTOR APPARATUS AND RELATED GASIFICATION SYSTEM

[75] Inventors: Franklin D. Hoffert, Mountainside; John D. Milligan, Little Silver, both of N.J.; Jose M. Marina; Jose M. Fernandez, both of Miami, Fla.

[73] Assignee: Hydrocarbon Research, Inc., Lawrenceville, N.J.

[21] Appl. No.: 208,762

[22] Filed: Nov. 20, 1980

Related U.S. Application Data

[63] Continuation of Ser. No. 33,503, Apr. 26, 1979, abandoned.

[51] Int. Cl.$^3$ .............................................. B01J 3/00
[52] U.S. Cl. .................................. 48/62 R; 34/57 A; 48/63; 110/245; 122/4 D; 422/143; 422/146; 422/311
[58] Field of Search ................ 202/268; 422/143, 146, 422/221, 311; 48/73, 71, 77, 63, 64, 62 R, 76, 87; 266/172; 110/243, 244, 245, 263; 239/397.5 S; 34/57 A, 57 C; 122/4 D; 165/81; 431/170, 7

[56] References Cited

U.S. PATENT DOCUMENTS

| | | | |
|---|---|---|---|
| 2,628,158 | 2/1953 | Wilcox et al. | 34/57 A |
| 2,934,411 | 4/1960 | Purse | 34/57 A |
| 3,391,913 | 7/1968 | Jones | 34/57 A |
| 3,598,374 | 8/1971 | Nauta | 34/57 A |
| 3,602,296 | 8/1971 | Heyn et al. | 165/81 |
| 3,981,690 | 9/1976 | Chen et al. | 48/73 |
| 4,062,656 | 12/1977 | Blaser et al. | 48/73 |
| 4,146,369 | 3/1979 | Flesch et al. | 48/201 |

OTHER PUBLICATIONS

"Chemical Engineer's Handbook," edited by Perry, Chilton, Kirkpatrick, 1963, pp. 11-8.

Primary Examiner—S. Leon Bashore, Jr.
Assistant Examiner—Michael L. Goldman
Attorney, Agent, or Firm—Vincent A. Mallare; Fred A. Wilson

[57] ABSTRACT

A process and pressurized, gasification reactor apparatus for converting combustible carbon containing materials such as coal char and other carbonaceous solids or carbonaceous solids/heavy oil combinations to an intermediate heating value fuel gas. The gasification reactor includes an insulated fluidized bed reactor chamber, an upper reactor housing for a freely suspended bayonet bundle type heat exchanger for (a) superheating incoming saturated steam and (b) cooling outgoing high temperature product gas, and a lower reactor housing structure which includes a free-floating, conically-shaped perforated plenum chamber. The superheated steam and oxygen are premixed with the plenum chamber before being pressure directed into the fluidized bed reactor chamber for mixture and combustion with the incoming combustible carbon containing materials such as coal char. After reaction of the superheated steam, oxygen and coal char in the fluidized bed reactor at temperatures ranging from 900° F. to 1750° F., the product fuel gases and associated particulate matter are cooled by steam flowing through the bayonet heat exchanger, the steam being superheated by this exchange. After discharge from the heat exchanger, the fuel gas product containing particulate matter is pressure directed into a conventional cyclone separator for (a) separation of the desired product gases and (b) return of the particulate matter for further recycling in the reactor chamber. Undesirable ash clinkers are gravitationally and pressure directed out of the reactor chamber through a central ash withdrawal pipe.

19 Claims, 5 Drawing Figures

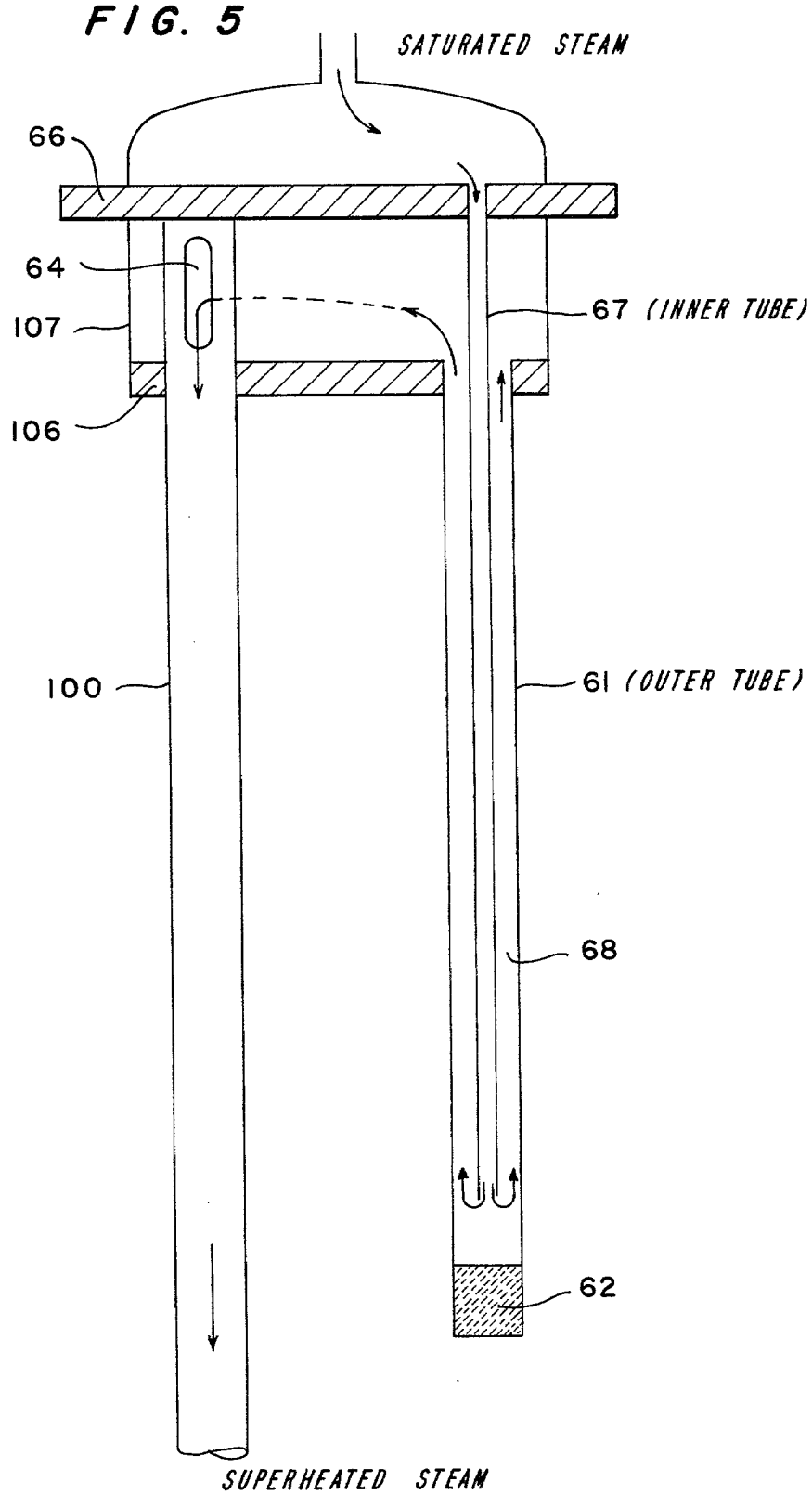

FLUIDIZED BED REACTOR APPARATUS AND RELATED GASIFICATION SYSTEM

This is a continuation of application no. 33,503, filed Apr. 26, 1979 now abandoned.

BACKGROUND OF THE INVENTION

The present invention relates to an improved reactor apparatus and recycle system for the gasification of combustible carbon containing materials such as, but not limited to, coal. More specifically, this invention is concerned with the production of raw product fuel gases containing mostly methane, hydrogen and carbon monoxide as a source of energy by gasifying coal char and other such carbonaceous materials by means of an improved fluidized bed reactor assembly and associated process.

In recent years, with the rapid depletion of natural gas reserves, the current political unrest in the Middle East oil producing countries, and the growing worldwide shortage of petroleum as a major source of fuel, attention has been increasingly focused on the prodigious carbonaceous material reserves in the United States. Accordingly, there has been renewed general interest in the gasification of combustible carbon containing materials as a source of fuel and greater attention devoted to the specific apparatus and techniques employed to increase the resulting energy output for a given amount of carbonaceous material.

Throughout the following specification, reference is made to coal and/or coal char. It is to be understood, however, that the scope of this invention clearly contemplates the use of combustible carbon containing materials in general, including, but not limited to, carbonaceous solids and carbonaceous solids/heavy oil combinations. Such carbonaceous materials and/or heavy oil combinations used to generate intermediate heating valve fuel gas are well known to those skilled in the art.

KNOWN GASIFICATION PROCESSES

It is against the foregoing background that this invention concerns itself. The gasification of coal has been known for decades and, indeed, there are numerous such processes which are known in the art. See "Gas Generator Research and Development: Survey and Evaluation," published by Bituminous Coal Research, Inc. (1965).

Of the numerous known coal gasification processes, there are four in particular which are among the most advanced processes in this area. These are: the "Bi-Gas" process used for the conversion of coal to substitute natural gas; the "HYGAS" process designed to convert coal of any rank or sulfur content to high-BTU gas interchangeable with natural gas; the "Lurgi" process for producing SNG from coal; and the "Synthane" process for production of SNG from any coal. A description of these general processing techniques can be found in "Hydrocarbon Processing Handbook," Hydrocarbon Processing (May 1974) at pages 122–125. These processes, in general, comprise the gasification of coal in a single reactor converter to produce an off gas containing hydrogen and carbon monoxide. According to these processes, a water gas shift reaction is then carried out in a separate converter to adjust the ratio of hydrogen to carbon monoxide in the product gas when needed.

Generally speaking, the gasification processes discussed above are characterized by relatively low throughput rates per unit volume and consequently, by relatively high capital expenditure requirements per unit throughput capacity.

A more recent coal gasification assembly employs a fluidized bed reactor apparatus with a sloping plenum chamber wherein the plenum chamber is rigidly connected to the reactor housing itself. This assembly is described in U.S. Pat. No. 4,062,656 which issued on Dec. 13, 1977. According to this patent, a perforated plenum grid is used which is rigidly connected to the inner reactor periphery, supporting uprights and to a center well. Because of these rigid (as opposed to "floating") connections, detrimental hot spots can develop within the reactor assembly. For example, one such representative problem area is that area near the reactor wall plenum grid interface. This causes alternating compressive and tensile stresses to develop during reactor heating and cooling phases which may cause fatigue and/or reactor failure. Additionally, the fluidized bed reactor apparatus of this patent does not employ an internal heat exchanger. Accordingly, a mixture of steam and air is introduced through the bottom of the reactor and the internally developed reactor heat energy is not effectively utilized to preheat (superheat) the incoming source of steam.

Furthermore, U.S. Pat. No. 4,062,656 requires a more complicated two-step pressure drop across the gasification nozzles to achieve control of the "fines" or particulate matter in the fluidized bed reactor. This is contrasted with the present invention, wherein the "fines" are effectively controlled by means of an associated cyclone separator located at the top of the reactor. With the cyclone separator, only the coarser "fines" are recycled to the fluidized bed reactor chamber.

Another recent process and apparatus for the gasification of carbonaceous solids is described in U.S. Pat. No. 3,988,123, which issued Oct. 26, 1976. According to this three-stage gasification process, a stream of entrained pulverized coal is first fed into the combustion stage together with a mixture of oxygen and steam at selected pressures and temperatures. The combustion stage products are then passed into a second quenching stage, where they are partially cooled and further reacted with either water or steam. During this stage, ash is solidified into small particles, and the formation of soot is suppressed by water and steam injections during the quench stage.

Finally, the products from the quench stage pass directly into a third heat recovery stage where the resultant raw gas products pass through a single pass shell and tube heat exchanger wherein steam is generated on the shell side and utilized for the steam feed process requirements. According to this patented process, however, the single pass shell and tube heat exchanger is rigidly mounted at the reactor bottom whereby it is not permitted to freely move and allow for differential thermal expansion. Additionally, the three-stage process of U.S. Pat. No. 3,988,123 employs an entrained flow gasifier as opposed to the fluidized bed reactor of this invention.

Neither of the two aforementioned patents provide the general flexibility and material design latitude of the present invention. These features are afforded by, among other things, the free-floating plenum chamber and the free floating, top-supported heat exchanger, both of which permit differential thermal expansion.

Additionally, the aforementioned "floating" design characteristics, in combination, with the cyclone separator recycle feature, develop a more efficient reactor apparatus and system.

SUMMARY OF THE INVENTION

The present invention overcomes the problems and disadvantages of the prior art by providing a coal gasification reactor assembly and process which utilizes the following elements: a reactor vessel housing structure; a fluidized bed reaction chamber; means for introducing sources of oxygen, steam and raw carbonaceous char, respectively, into the reaction chamber; a means for generating a fluidized bed reaction atmosphere within the reaction chamber wherein this general means is comprised of a floating plenum chamber which is located near the reaction chamber and is uniquely adapted to allow for differential thermal expansion; a means for removing the resultant product gases (and associated particulate matter) which are produced in the reaction chamber; and a floating heat exchanger located within the reactor housing structure wherein the heat exchanger is similarly adapted to permit differential thermal expansion.

The invention described herein provides for an improved gasification reactor assembly and process which increases the heating value yield from carbonaceous char sources and utilizes a portion of the internally-developed heat of reaction to preheat a source of incoming saturated steam.

An additional advantage of this invention is that it utilizes an internal heat exchanger and a plenum chamber, both of which are uniquely constructed to eliminate differential thermal expansion, produce greater reactor efficiency and permit more latitude in the selection of reactor materials. The foregoing advantages are accomplished by effectively "floating" both the heat exchanger and the plenum chamber within their respective housing structures. In this manner, conventional hot spots and detrimental thermal expansion is avoided.

It is an object of this invention to develop an improved and more efficient gasification process by incorporating a cyclone separator to separate the product gas from its associated particulate matter and return the particulate matter to the reaction chamber for recycling.

Another object of this invention is to utilize a bayonet-type heat exchanger to effectively preheat the incoming saturated steam and cool the outgoing product gases, thereby increasing the overall operating efficiency and permitting a lower exiting gas temperature.

A further object of this invention is to more efficiently withdraw deleterious ash from within the reaction chamber by means of a downwardly, inwardly sloping plenum grid and associated withdrawal pipe. This deleterious reactor ash, conventionally referred to as "clinkers," is not only gravitationally directed, but also pressure-induced out a central withdrawal pipe by means of angularly directed plenum grid nozzles. The more efficient ash withdrawal accomplished according to this invention improves the overall gasification reaction process and avoids unnecessary reactor failure and/or shutdown.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

In one preferred embodiment to achieve the foregoing objects, this invention employs a pressurized coal gasification reactor assembly apparatus comprised of the following elements: an internally insulated reactor vessel housing structure; a fluidized bed reaction chamber; means for introducing external sources of preheated oxygen, preheated steam, and carbonaceous char feed into the fluidized bed reaction chamber; a floating plenum chamber means for generating a fluidized bed reaction atmosphere within the reaction chamber, wherein the plenum chamber is located directly below the reaction chamber and is specifically adapted to permit differential thermal expansion. The plenum chamber is comprised of a pair of conically-shaped plates which are integrally connected at their respective outer ends and which include downwardly extending wall members at their respective inner ends. The upper conically-shaped refractory protected grid plate includes a plurality of openings and is separated from the lower conically-shaped plate by suitable support means. The grid plate slopes downwardly and inwardly to a central withdrawal pipe. The grid plate is provided with a plurality of nozzles with matching openings in the refractory coating, through which the premixed oxygen and superheated steam are directed into the reaction chamber. A floating heat exchanger is located in the upper reactor housing structure. This heat exchanger is specifically adapted for use with the internally developed high temperature product gases and the external source of lower temperature saturated steam. The heat exchanger is preferably a bayonet-bundle type heat exchanger which includes an upper tubesheet and a plurality of associated inner tubes, a lower tubesheet and a plurality of associated outer tubes wherein the upper tubesheet is adapted to suspend itself from a circumferentially extending shelf located within the upper reactor housing structure; and a conventional cyclone separator for separating the resultant product gas from its associated particulate matter. This separator is adapted to return the separated particulate matter to the reaction chamber for further recycling.

The accompanying drawings which are incorporated in and constitute a part of this specification illustrate but one embodiment of the invention and together with the description, serve to explain the principles of the invention.

BRIEF DESCRIPTION OF THE DRAWINGS

FIG. 1 shows the char feed inlet (A), the saturated steam inlet (C), and the desired raw product gas outlet (B), which emanates from a conventional cyclone separator and after further processing is directed toward a fuel consuming device such as an electric power generator or a gas distribution system.

FIG. 5 is an enlarged scale view of a typical tube configuration as shown in FIG. 3.

DESCRIPTION OF THE PREFERRED EMBODIMENT

Reference will now be made in detail to the present preferred embodiment of the invention, an example of which is illustrated in the accompanying drawings.

OUTLINE OF PREFERRED EMBODIMENT

Figure 1:
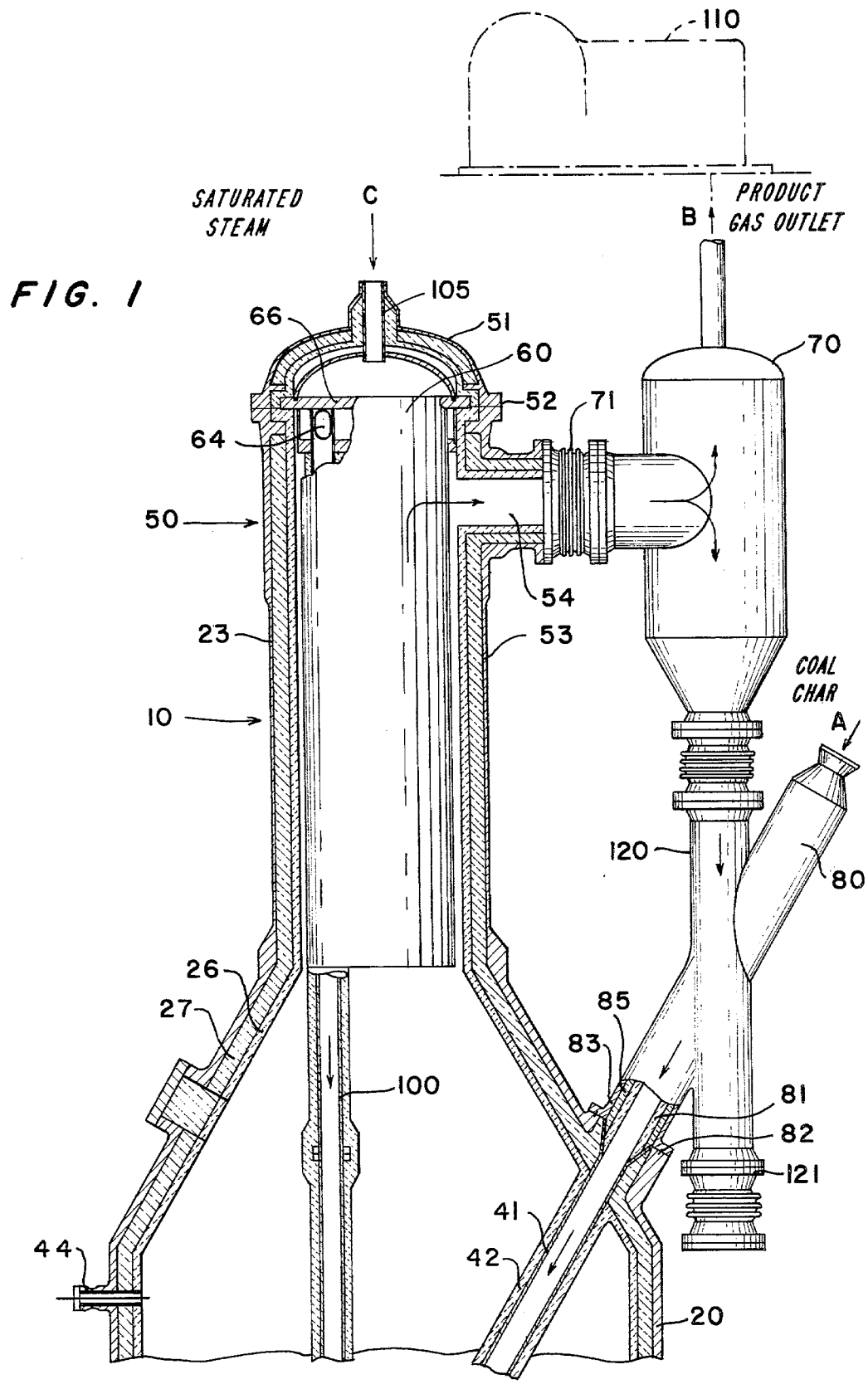
FIG. 1 is a view of the upper half of a fluidized bed gasification reactor in partial, cut-away form to reveal the interior of the reactor. More particularly.
Figure 2:
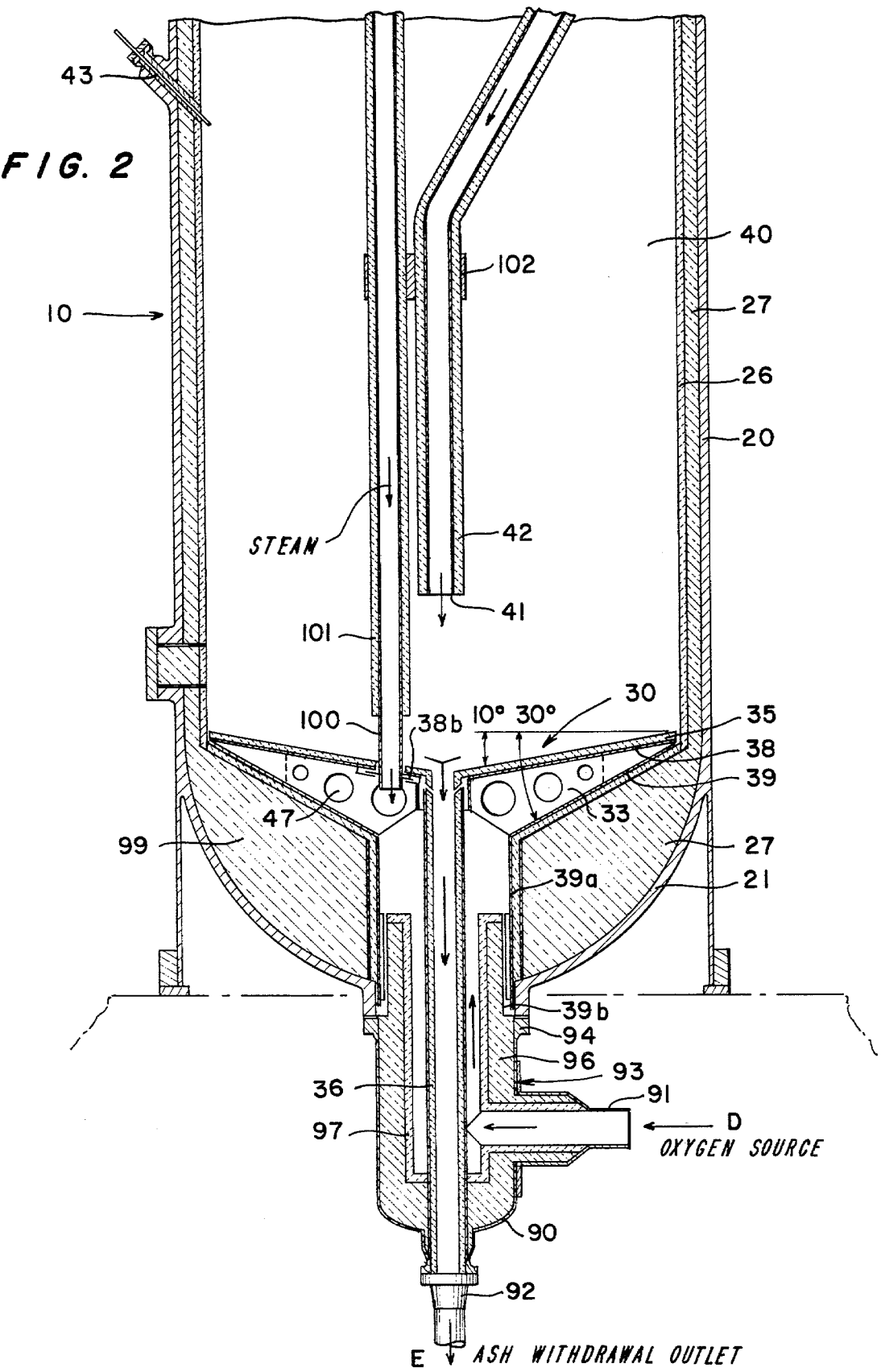
FIG. 2 is a sectional view of the corresponding bottom half of the gasification reactor showing the hot air (oxygen) inlet (D), the ash withdrawal outlet (E), and the inwardly, downwardly sloping plenum chamber grid.

The preferred embodiment of the fluidized bed gasification reactor is shown generally by combined FIGS. 1 and 2, and is represented generally by the numeral 10. The major elements of the reactor include an outer reactor vessel 20, a conically-shaped plenum chamber referred to generally as numeral 30, a fluidized bed reactor chamber 40, an upper reactor vessel housing 50, a floating bayonet-type heat exchanger 60, a conventional cyclone separator 70, a coal char (or other carbonaceous material) inlet 80, and a lower reactor housing 90.

In general overall reactor operation, a preheated combustion source such as air or oxygen or combinations of both is pressure directed via the lower reactor housing 90 at (D) up into plenum chamber 30 (as shown by the arrows in FIGS. 2 and 4), wherein it is premixed with superheated steam coming out of steam inlet pipe 100. The superheated steam comes from an external source of saturated steam which enters the upper reactor housing 50 at entry port (C) and is superheated after having passed through bayonet-type heat exchanger 60.

The premixed combustion source (air or oxygen or mixtures thereof) and steam source (superheated steam) are then pressure directed up into the fluidized bed reactor chamber 40 by means of perforated plenum grid 35. In reactor chamber 40, the oxygen and steam mixture react with the coal char (which is introduced from an external source at A) to produce raw product gases and associated particulate matter. This product gas-particulate matter mixture is then pressure directed upwardly through the floating heat exchanger 60, wherein it is cooled and subsequently passed through a conventional cyclone separator 70. At this point, the desired raw product gas, which includes the associated char particulate matter, is separated so that the product gas passes from the separator at (B) to a conventional clean up step (such as an acid gas clean up step, not shown) and then to an external user system, such as an electric power generator represented schematically as numeral 110. Simultaneously, the separated particulate matter (char) is returned to reactor chamber 40 via return line 120 for further reaction.

The undesirable, agglomerated or fused char ash (clinkers) which is inevitably generated in a coal gasification reaction system accumulates at the bottom of the reactor vessel. These clinkers are then directed inwardly and downwardly across perforated plenum grid 35, through withdrawal pipe 36 and out the ash withdrawal outlet at (E).

Significantly, both the heat exchanger 60 and the conically-shaped plenum chamber 30 are generally positioned within the reactor 10 in a "floatable" manner to accommodate thermal expansions and contractions. The entire reactor system is provided with strategically located expansion means. One such representative expansion means is the annular plenum inner leg expansion joint, generally referred to as numeral 37. Perforated plenum grid 35 is connected to withdrawal pipe 36 by means of annular expansion joint 37. Plenum grid 35 is not integrally or rigidly connected to any interior vessel wall and is supported principally by refractory material 99. Accordingly, the perforated plenum grid 35 effectively "floats" and is free to move following differential thermal expansion in virtually any direction.

Similarly, heat exchanger 60 is provided with both lateral and vertical expansion means. More particularly, heat exchanger 60, in its preferred embodiment, is adapted to effectively hang or "float" from circumferential shelf 65 with expansion spaces 130 and 131 located respectively above and outside exchanger upper tube sheet 66.

GASIFICATION REACTOR

Gasification reactor 10 may be of any commercially acceptable size, shape and/or configuration to accommodate the aforementioned elements, which elements are only representative of their associated means functions. Additionally, individual reactors can be arranged in parallel to accommodate any desired operating capacity. A typical individual reactor 10 construction of this invention, however, constitutes an overall reactor height of approximately 100 feet and outer diameter of approximately 25 feet.

Similarly, outer reactor vessel wall 20 may be of any suitable construction material. In a typical embodiment, outer wall 20 is $3\frac{1}{2}$ inches thick (about the fluidized bed reactor chamber 40) and is adapted to withstand normal high temperature, high pressure reactor conditions. Outer wall 20 becomes hemispherical at its lower body portion 21, wherein it is adapted to communicate with lower reactor housing means 90, and is provided with conventional installation support means shown generally as numeral 22.

The upper portion 23 of outer wall 20 is approximately $1\frac{1}{2}$ inches thick because of the decreased diameter of the vessel which exists near the heat exchanger 60 location. This wall thickness, of course, can vary throughout the reactor location depending upon particular design requirements.

The preferred embodiment of this invention employs a reactor vessel internally lined with two layers of refractory insulation material, as shown in FIGS. 1-4. The first layer, which is adjacent to the outer vessel wall 20, is an insulating refractory material 27. The second layer of refractory 26 which faces the interior of the vessel is an erosion-resistant refractory. Similarly, the hemispherical bottom interior portion 99 of the reactor vessel is packed with a selected castable material or other suitable insulation.

LOWER REACTOR HOUSING ASSEMBLY APPARATUS AND OPERATION

Figure 4:
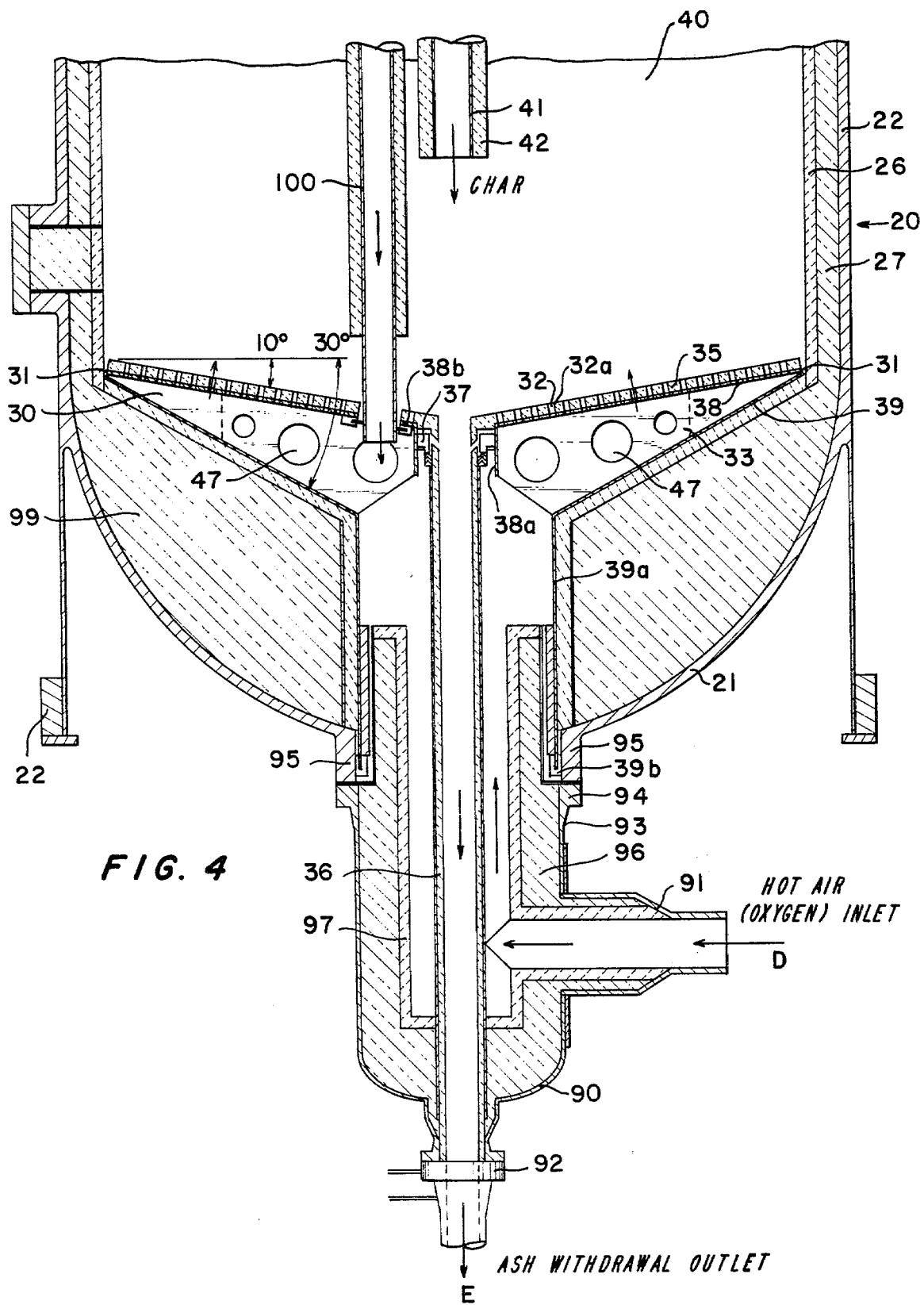
FIG. 4 is a detailed sectional view of the lower portion of the gasification reactor vessel showing the floating plenum chamber and associated nozzle grid structure in detail.

The lower housing apparatus and assembly is depicted in FIGS. 2 and 4. In general the lower reactor housing assembly 90 is designed to provide an inlet means 91 for an external source of oxygen or oxygen-containing gas, an outlet means 92 for ash withdrawal pipe 36, and to provide a sealing means referred to generally as numeral 93, to effectively retain and close off the hemispheric lower reactor portion. This is accomplished by means of a lower flange 94 which communicates with an annularly shaped lower extension 95 of outer reactor wall 20. Flange 94 and extension 95 are joined by conventional connecting means, e.g. bolts and nuts with associated gasket means.

Disposed within flange 94 is a generally cup-shaped section of insulating castable material 96 and an internal four-inch thick lining of refractory castable material 97 such as Greencast 94. Accordingly, incoming oxygen containing gas is pressure directed through entry port (D), in the path indicated in FIGS. 2 and 4; up into plenum chamber 30 for premixing with the superheated steam. As previously indicated, the superheated steam is pressure directed from heat exchanger 60 through steam entry ports 64, and finally downwardly through steam pipe 100 which directs the superheated steam into plenum chamber 30. The incoming oxygen source usually enters at (D) at a temperature of approximately 1000° F., having been previously heated by any conventional heat source. Similarly, the superheated steam enters plenum chamber 30 at a temperature of approximately 1000° F. after having been preheated by heat exchanger 60.

PLENUM DESIGN

In general, the plenum chamber design is intended to provide a means for generating a fluidized bed reaction atmosphere within the reaction chamber 40. This plenum design, however, may be used in other contexts wherein it is desired to develop a greater internal pressure medium while at the same time allowing for the differential thermal expansion of the plenum chamber assembly. More particularly, the plenum design is comprised of a floating plenum chamber located proximate to the reaction chamber and is adapted to allow for differential thermal expansion.

Plenum chamber 30 is generally situated in the lower portion of reactor 10 and is intended to provide a general pressurized chamber means within which the gases from oxygen combustion source (D) and pressurized steam source (C) are mixed prior to entering the fluidized bed reactor chamber 40 through a plurality of nozzle openings 32. Because of the extreme temperature gradients which are inherent in high temperature, high pressure reaction vessels such as those contemplated by this invention, it is desired that appropriate expansion means be provided. The true scope of this invention contemplates any plenum chamber design construction wherein (a) the plenum chamber is adapted to "float" for temperature differential expansion purposes, and (b) wherein the plenum grid 35 is sloped so that the accumulated ash can be gravitationally and/or pressure withdrawn below.

The preferred plenum chamber embodiment, however, constitutes a chamber of conical shape, wherein the upper and lower surfaces 38 and 39, respectively, are downwardly and inwardly extending plates approximately one inch thick of high temperature material. Lower plate 39 includes a downwardly extending center wall member 39a which is connected to the inner diameter surface of said lower plate, which wall member is adapted to communicate generally (but not fixedly) with the inside diameter of outer vessel flange 95 and to floatably seat itself within an annular outer leg expansion joint means such as expansion joint 39b. Similarly, upper plenum surface 38 includes a corresponding downwardly extending wall member 38a, which is connected to upper plate 38 at its inner diameter surface by the annular inner leg plenum expansion joint means 37. The preferred plenum expansion joint 37 is a conventional packed joint. Additionally, upper plenum member 38 also includes an expansion means 38b to accommodate the projection therethrough of inlet pipe 100 which directs superheated steam into plenum chamber 30. Expansion means 38b may constitute a conventional two-way expansion joint. Plenum chamber 30 is supported principally on refractory material 99 contained within lower body portion 21, and is restrained from appreciable upward movement resulting from internal gas pressure differential by center extension member 39a.

The conically-shaped upper and lower plates 38 and 39, respectively, are integrally connected at their outer diameter surfaces at point 31 and are separated from one another by a plurality of radially extending bracket-like members 33, each of which includes aperture(s) (holes) 47 to facilitate plenum chamber mixing of the combustion and steam sources, e.g., oxygen and superheated steam. The preferred reactor embodiment employs twelve equally spaced bracket members with three circular apertures to facilitate mixing therebetween. These radially-extending bracket-like members are approximately $\frac{5}{8}$ inches thick and are of conventional high temperature material construction.

Gridplate 38 preferably employs approximately 1800, $\frac{1}{4}$-inch diameter nozzles 32 which are screwed into the conical upper plenum plate 38. Obviously, the refractory 35a, which is directly connected to the plate 38, is adapted with a plurality of corresponding nozzle openings 32a to accommodate the same grid plate nozzles 32. The nozzles 32 and nozzle openings 32a may be designed to pass through grid plate 38 and refractory 35a according to a variety of angles and configurations. It is preferred, however, that the nozzles and nozzle openings are cylindrical in shape and perpendicularly oriented to the respective plenum upper plate 38 and grid 35 refractory surfaces.

This invention also contemplates plenum members which slope downwardly-outwardly, wherein ash removal could be accommodated at the outer plate diameters by conventional ash withdrawal means. Additionally, upper and lower plenum plates 38 and 39 can be oriented at a multitude of angles with the horizontal.

In the preferred embodiment, however, both grid plate and lower plenum plates slope downwardly and inwardly. As can be seen in FIGS. 2 and 4, grid plate member 38 is preferably at an angle of 10° below horizontal and lower member 39 is 30° below horizontal. This particular configuration is found to develop the desired mixing within the plenum chamber and to accommodate maximum fluidized distribution within the fluidized bed reactor chamber 40, while at the same time promoting ash removal through ash withdrawal pipe 36 and out ash withdrawal outlet (E). Similarly, annular expansion joint means 37 and 39b, respectively, permit the conically-shaped plenum chamber to effectively "float" without detrimental differential thermal expansion. This floating characteristic also obviates the development of undesirable hot spots which normally exist at plenum plate-reactor wall connection points in conventional reactor designs.

As discussed above, in any conventional coal gasification reactor design, undesirable "clinkers" will accumulate at the bottom of the fluidized bed reactor chamber. These clinkers can cause non-equalized flow in the fluidized bed reactor, undesirable temperature and pressure gradients, and can cause reactor shutdown. It is theorized that because of the slope (e.g., 10° below horizontal) of the conically-shaped grid plate 38 and refractory 35a, respectively, together with the resultant angular positioning of the projecting nozzles through which premixed steam and oxygen is forced, the accumulated clinkers are both gravitationally and pressure-induced toward withdrawal pipe 36 and out of the reactor system through outlet (E).

FLUIDIZED BED REACTION CHAMBER

The premixed oxygen and superheated steam are jetted upwardly through perforated plenum grid 35 into fluidized bed reactor chamber 40. Therein, the oxygen-steam mixture is further mixed with both the coal char and recycled particulate matter coming from the cyclone separator 70. Both the coal char and the recycled particulate matter jointly enter chamber 40 by means of char entry pipe 41. While char entry pipe can be of any conventional high temperature design or configuration, the invention prefers an alloy steel pipe wrapped with 4-inch thick Greencast 94 refractory castable, shown as numeral 42, to withstand the internally developed reactor temperatures and pressures.

When the premixed oxygen and superheated steam react with the incoming coal char (which is primarily carbon), a number of reactions take place within the fluidized bed reactor chamber. Such representative reactions are set forth below:

(1) $C + O_2 \rightleftharpoons CO_2$
(2) $2C + O_2 \rightleftharpoons 2CO$
(3) $C + CO_2 \rightleftharpoons 2CO$
(4) $CO + H_2O \rightleftharpoons CO_2 + H_2$
(5) $C + 2H_2 \rightleftharpoons CH_4$
(6) $CH_4 + H_2O \rightleftharpoons CO + 3H_2$
(7) $C + H_2O \rightleftharpoons CO + H_2$ The aforementioned reactions, which of course are not all inclusive of the many reactions which can or do take place within the reactor, generate a predominantly exothermic reactor response which develops high temperatures within reactor chamber 40. The reaction of carbon and oxygen (reactions 1 and 2) are exothermic and hence accompanied by the liberation of heat. The principal product is carbon monoxide, although carbon dioxide is also produced. The reaction of carbon with steam, however, is endothermic and the principal reaction products are hydrogen and carbon monoxide. Accordingly, these competing chemical reactions, as is well known to those skilled in the art, can be controlled by varying the ratio of oxygen to carbon as well as the ratio of oxygen to steam so that the overall reactor operating characteristics can be maintained at the desired temperature level. Reactions 4 and 7 are the well-known water gas shift reaction and water gas reaction, respectively.

As stated previously, the aforementioned reactions are representative only. Accordingly, the nature and content of the product gases can be effectively controlled by varying the nature and content of the carbonaceous source itself, the relative amounts of both the oxygen and steam sources, as well as the selected operating temperatures and pressures, respectively. One such representative reactor operating example is set forth below in general Example I.

EXAMPLE I

As generally shown by FIGS. 1 and 2, 2500 ton/day coal char produced from Illinois No. 6 coal is pressurized, usually in lock hoppers (not shown), to 200-600 psig pressure and fed at about 600° F. temperature through inlet (A) and entry pipe 80 into the bottom portion of the gasification reaction zone 40. Pressurized superheated steam is introduced at inlet (C) and oxygen-containing gas is introduced at inlet (D) for mixing in plenum 30. The coal char is gasified in reaction zone 40 at about 1700°-1800° F. temperature, which is preferably below the ash agglomerating temperature. The resulting ash is withdrawn downward through pipe 36 and outlet (E).

The raw gas produced, including entrained solids, passes upwardly through the internal bayonet-type heat exchanger 60 located in the upper portion of the reaction zone. The heat exchanger recovers heat from the raw gas product by superheating the pressurized steam which is fed to the gasifier at (C). This heat exchanger 60 is pressure-balanced and operates at relatively low external gas velocity and high internal steam velocity to reduce tube hot wall temperatures. Inclusion of this heat exchanger in the reactor benefits the gasification process by significantly increasing the overall thermal efficiency and product gas heating value.

The hot gas leaving the heat exchanger is then passed through a cyclone separation step at 70 to remove solids as described hereinafter, to produce about $130 \times 10^6$ SCF/day fuel gas having heating value of 310-350 Btu/SCF and some distillate oil products.

Another set of suitable reactor conditions, including representative feed and product rates, is set forth below in specific Example II.

EXAMPLE II

| Temperature | 1750° F. | | |
|---|---|---|---|
| Pressure | 389 psia | | |
| FEED | | PRODUCT | |
| | Lbs./Hr. | | Lbs./Hr. |
| Char | 606,475 | $N_2$ | 1,190,283 |
| Air | 1,549,960 | $CO_2$ | 595,358 |
| Steam | 855,131 | CO | 503,340 |
| | | $H_2$ | 49,485 |
| | | $CH_4$ | 50,410 |
| | | $H_2O$ | 485,664 |
| | | Misc. | 19,336 |
| | | Solids | 117,690 |
| TOTAL | 3,011,566 | TOTAL | 3,011,566 |

In general, the condition of reactor chamber 40 is such that the incoming coal char is fluidized, i.e., rendered into turbulent mobility so that the coal char behaves like a boiling liquid. More specifically, the incoming oxygen-superheated steam mixture from the perforated grid plate 38 is distributed and diffused within chamber 40 so as to maintain the coal char solids of the fluidized bed in the proper solids fluidizing condition.

As the aforementioned reactions progress within chamber 40, the raw product gases and some particulate matter generally migrate upwardly toward the upper reactor vessel housing structure 50. The entire reactor apparatus and method is temperature and pressure controlled. To obtain desired operating conditions, a control test thermocouple 43 and control test pressure gauge 44 are strategically located within reactor chamber 40. These test devices are conventional in design and, as is well known in the art, can be integrated with conventional external controls to develop the desired operating temperatures and pressures within the reactor apparatus itself and throughout the gasification system.

UPPER REACTOR HOUSING AND HEAT EXCHANGER DESIGN

Figure 3:
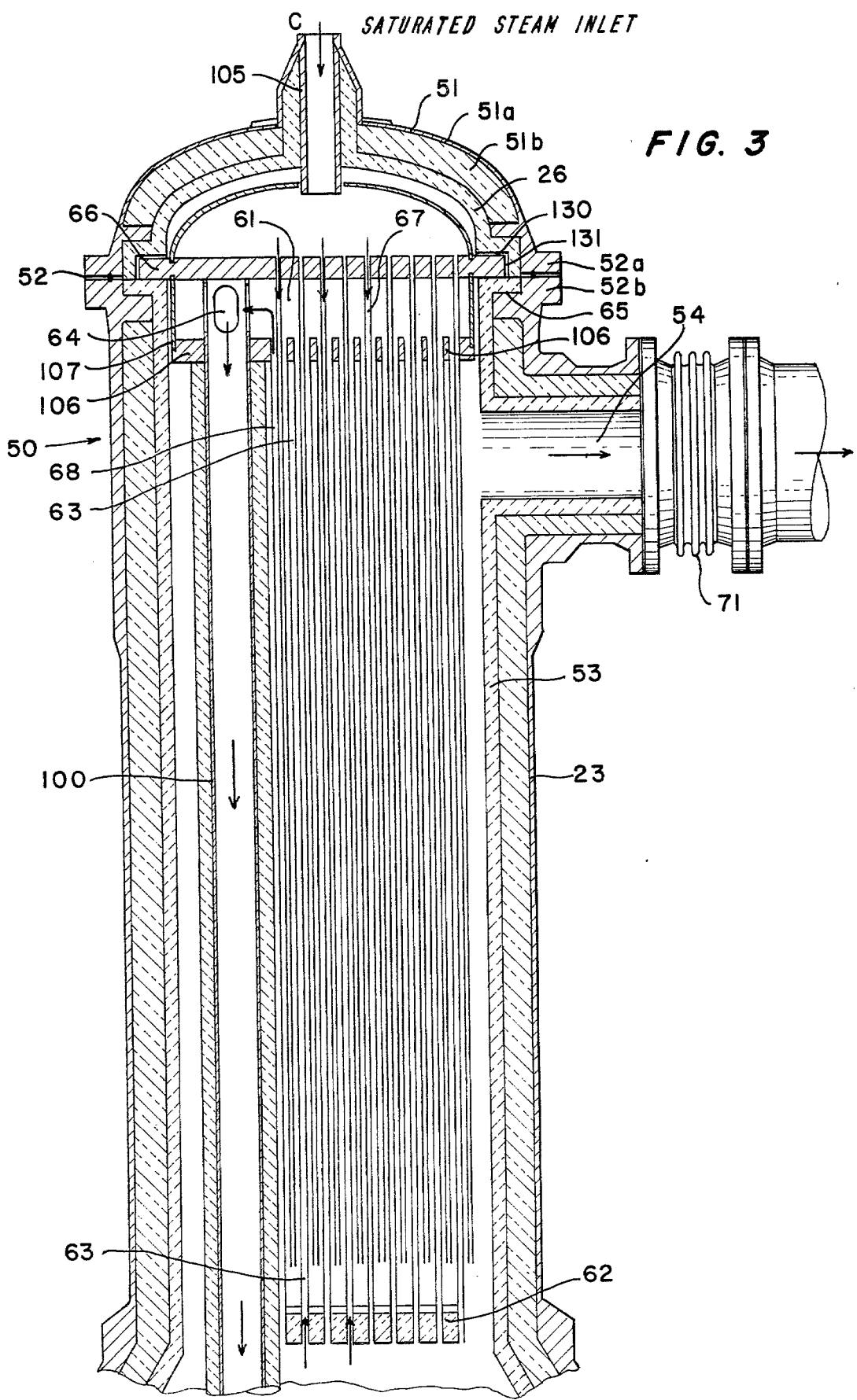
FIG. 3 is a partial sectional view which shows the floating bayonet-type heat exchanger positioned at the top of the gasification reactor.

The upper reactor design, including that of heat exchanger 60, can be ascertained from FIGS. 1 and 3. In general, the upper reactor housing design is intended to provide a means for heating the incoming saturated steam, cooling the outgoing raw product gases, and providing an outlet for the outgoing product gases (and associated particulate matter). An important design criterion is that the heat exchanger 60 be positioned within the upper reactor vessel housing structure 50 in such a manner as to accommodate differential temperature gradients and resultant material expansion. In general, the placement of a heat exchanger within the reactor housing itself fosters a more efficient overall reactor operation and permits the use of lower temperature housing materials. Furthermore, the exchanger's floating design feature avoids conventional problems associated with hot spotting and detrimental thermal expansion.

While this invention contemplates a number of upper reactor design alternatives to accomplish the aforementioned apparatus and process objectives, a preferred design embodiment is set forth below.

Upper reactor vessel housing 50 includes an elliptically shaped head 51 with a continuing flange 52a which is connected by connecting means 52 (bolts and nuts) to flange 52b on upper housing cylindrical portion 50 of substantially the same diameter as that of elliptical head 51, albeit reduced in comparison to that of the fluidized bed reactor chamber 40. A typical overall upper housing reactor diameter is approximately 9½ feet. Additionally, cylindrical portion 50 includes an exit port 54 near the upper portion of the heat exchanger, which provides an exit means for removing the "cooled" raw product gases and associated particulate matter from inside the reactor.

In operation, saturated steam from an unshown external source is introduced into the reactor 10 at (C) by means of pipe 105 which protrudes through elliptical head 51. In its preferred embodiment, elliptical head 51 of approximately 1½ inch thick metal construction includes an intermediate thickness of insulating refractory material 51b, which is directly bonded on its outermost side to the elliptical head. Refractory lining 26, which may be a four-inch thick Greencast 94 refractory castable material, is bonded to the inside of refractory 51b.

Connecting elliptical head 51 and the upper reactor cylindrical portion 23 is outer flange means referred to generally as numeral 52 which is made of the same material as outer shell 51a. In fact, upper flange portion 52a is an integral portion of outer shell 51a. This upper flange portion 52a is connected to lower flange portion 52b by any conventional flange connecting means, i.e., bolts and nuts.

Heat exchanger 60 includes tube sheet 66 of alloy construction (typically about 98 inches in outside diameter and eight inches thick) which is suspended from a circumferentially extending shelf 65 formed by the upper portion of interior reactor wall 26. Upper tube sheet 66 includes a plurality of inner tubes 67 through which the incoming steam passes. Also suspended from upper tube sheet 66 is lower exchanger platform 106 which is connected thereto by means of an alloy steel connecting shell 107. Shell 107 is typically 70 inches in inside diameter, ½ inch thick and includes a plurality of tubes 61 through which the superheated steam passes.

As referred to previously, exchanger plate or tube sheet 66 seats upon the circumferential shelf 65 so that upper and outer expansion spaces, 130 and 131 respectively, are provided to accommodate differential material expansion.

While heat exchanger 60 can be of varying shape and construction so long as it accomplishes the requisite heat transfer and is adapted to effectively "float" within the upper reactor housing structure 50 as indicated above, the invention prefers a conventional bayonet-type bundle heat exchanger. For this particular reactor design, the bayonet heat exchanger is typically approximately 24 feet in length, seven feet in diameter, and includes approximately 365 longitudinally extending tubes on a 3½ inch square pitch spacing.

More particularly, bayonet heat exchanger 60 includes a plurality of downwardly extending outer tubes 61 which are typically approximately 1½ inches in diameter. These tubes depend downwardly from lower tube sheet 106, and are totally closed at their respective lower ends. As can be seen in FIG. 3, refractory plugs 62 are used to shield tube ends from heat. Located within each downwardly extending outer tube 61 is a corresponding inner tube 67 of reduced diameter. The inner tubes 67 are similarly suspended from a upper exchanger tube sheet platform 66, which is typically approximately 80 inches in diameter and eight inches thick. Both the inner tubes 67 and outer tubes 61 are of high temperature material construction.

Bayonet heat exchanger 60 also includes a plurality of upper steam entry ports 64 (the embodiment of FIG. 3 prefers four such ports, one of which can be seen in the cut-away sectional view). It is through these ports 64 that the superheated steam is pressure directed into steam inlet pipe 100 for transmission to plenum chamber 30. Inlet pipe 100 is typically approximately 12 inches in diameter, wrapped with four-inch thick refractory castable insulation 101, and fixedly connected to char inlet pipe 41 by means of any conventional connecting means such as the guide strap 102 shown in FIG. 2.

In operation, an external source of saturated steam is pressure directed, first downwardly through inner tubes 67 which exist within each of the outer tubes 61. This saturated steam, which enters at approximately 460° F. and at a pressure of approximately 445 psig, is pressure directed down through tubes 67 and returned upwardly by means of the annulus 68 between the outside of tubes 67 and the inside of tubes 61.

Correspondingly, the raw product gases developed within reactor 40 to temperatures of approximately 1700° F. are directed upwardly through exchanger channels 69 between tubes 61. The incoming saturated steam passes downward and then flows upwardly in the annulus 68 formed by tubes 61 and 67. After this heat exchange, the incoming saturated steam is effectively heated from approximately 460° F. to a superheated state of approximately 1,000° F. The superheated steam is then pressure directed through entry ports 64 and inlet pipe 100 downwardly into plenum chamber 30 to premix with the preheated, incoming oxygen or air-oxygen mixture after having removed heat from the outgoing raw product gases. Therefore, the outgoing raw product gases which enter the bottom portion of the bayonet heat exchanger at a temperature of approximately 1700° F. leave the upper reactor housing structure through exit port 54 at a temperature of approximately 1460° F. Notwithstanding these temperature gradients which exist within the heat exchanger, differential thermal expansion of the floating heat exchanger 60 is permitted by expansion means 130 and 131.

CYCLONE SEPARATOR AND RECYCLE DESIGN

These cooled raw product gases (and associated particulate matter), after having departed through exit port 54, pass through a conventional connecting means such as a 48 inch diameter self-equalizing expansion joint 71 as shown in FIG. 1 into a conventional cyclone separator 70, wherein the gas and particulate matter are separated.

The separated raw product gases are then directed outwardly to an acid gas clean-up step (not shown) and then to some external storage or user facility, such as the power generator shown schematically as numeral 110 in FIG. 1. Conversely, the separated char particulate matter is directed downwardly through char return line 120 and into the raw char feed entry pipe 80 which ultimately becomes char entry pipe 41 within reactor vessel 40.

Note in FIG. 1 wherein the raw char feed entry pipe 80 is shown in partial section, that the inner refractory lining 81 of four-inch thick Greencast lining effectively reverses itself at the inside of the reactor and effectively becomes the outer refractory castable portion of the char inlet pipe 41 within the high temperature reactor vessel 40.

Char entry pipe 80 also includes an outer pipe 83 of material similar to that of reactor outer wall 20. This outer pipe 83 is connected by conventional flange means at 82 to a complimentary extension of outer wall 20. Located within outer pipe 83 and inner lining 81 is a conventional insulation material 85 such as VSL-50 insulating castable. While not shown in detail in the attached drawings, the lower portion 121 of return char line 120 prefers the embodiment of a conventional self-equalizing, pressure-balanced expansion joint and associated tie rods.

It will be apparent to those skilled in the art that various modifications and variations can be made to the gasification reactor apparatus and method of the present invention without departing from the scope or spirit of the invention. By way of illustration, reactor 10 can be either a single reactor structure or a plurality of associated reactors to accommodate the desired commercial objective. Similarly, both plenum chamber 30 and heat exchanger 60 can be designed to "float" in a number of different ways to accommodate the differential thermal expansion.

As previously mentioned, while the preferred plenum chamber shape is of conical configuration, extending inwardly and downwardly to a central withdrawal pipe 36, the plenum chamber could be modified to extend downwardly-outward to outer diameter withdrawal means. Additionally, this invention clearly contemplates the use of combustible carbon containing materials in general, including but not limited to carbonaceous solids and carbonaceous solids/heavy oil combinations.

Thus, it is intended that the present invention cover not only the preferred embodiment disclosed herein, but is also intended to cover the modifications and variations of this invention provided they come within the scope of the appended claims and their equivalents.

What is claimed is:

1. A gasification reactor assembly comprised of the following:
    (a) a reactor vessel housing structure;
    (b) a fluidized bed reaction chamber having an inner periphery;
    (c) a means for generating a fluidized bed reaction atmosphere within said reaction chamber, wherein said means is comprised of a floating plenum chamber located proximate said reaction chamber and not fixed to the inner periphery of said reaction chamber, said plenum chamber being floatably seated on refractory material and unattached to any portion of the reactor vessel housing structure to allow for differential thermal expansion;
    (d) a means for introducing oxygen into said plenum chamber;
    (e) a means for introducing steam into said plenum chamber, said oxygen and steam being premixed within said plenum chamber;
    (f) a means for introducing combustible carbon containing material into said reaction chamber; and
    (g) a means for removing the resultant product gases from within said reaction chamber.

2. The combination of claim 1, wherein said floating plenum chamber is located near the bottom of said reactor housing and is provided with a perforated, conically-shaped plenum grid and associated ash removal means.

3. The combination according to claim 2, wherein said plenum grid slopes downwardly and inwardly to a central withdrawal pipe which is adapted to remove undesirable ash formed within the reaction chamber.

4. The combination according to claim 3, wherein said plenum chamber is comprised of a pair of conically-shaped plates which are integrally connected at their respective outer ends and which include downwardly extending wall members at their respective inner ends, wherein the upper plenum plate includes a plurality of openings and is separated from the lower plenum plate by suitable support means.

5. The combination according to claim 4, wherein said upper plate is separated from said lower plate by a plurality of equidistantly spaced bracket-like members.

6. The combination according to claim 5, wherein said perforated upper plate is provided with a plurality of nozzles extending therethrough.

7. The combination according to claim 6, wherein said nozzles extend therethrough at an angle perpendicular to the surface of said upper plate.

8. The combination according to claim 5, wherein said bracket-like members include apertures to facilitate the mixing of gases introduced into said plenum chamber.

9. The combination according to claim 4, wherein said downwardly extending wall members comprise first and second annular legs extending from the upper and lower plenum plates, respectively, said first leg having a smaller diameter than said second leg, and including first and second annular expansion means adapted to floatably receive said first and second legs, respectively, in a seating relationship.

10. The combination according to claim 9, wherein said plenum grid further includes an expansion means and an inlet pipe passing therethrough.

11. A gasification reactor assembly comprised of the following:
    (a) a reactor vessel housing structure;
    (b) a fluidized bed reaction chamber having an inner periphery;

(c) a means for generating a fluidized bed reaction atmosphere within said reaction chamber, wherein said means is comprised of a floating plenum chamber located proximate said reaction chamber and not fixed to the inner periphery of said reaction chamber, said plenum chamber being floatably seated on refractory material and unattached to any portion of the reactor vessel housing structure to allow for differential thermal expansion;

(d) a means for introducing oxygen into said plenum chamber;

(e) a means for introducing steam into said plenum chamber, said oxygen and steam being premixed within said plenum chamber;

(f) a means for introducing combustible carbon containing material feed into said reaction chamber;

(g) a means for removing the resultant product gases from within said reaction chamber; and (h) a floating heat exchanger located within said reactor housing structure, wherein said heat exchanger comprises multiple vertical tubes and the exchanger is adapted to allow for differential thermal expansion within the reactor.

12. The combination according to claim 11, wherein said heat exchanger is located near an upper portion of said reactor housing structure, and is adapted for use with the internally developed high temperature product gases and an external source of lower temperature steam.

13. The combination according to claim 11, wherein said heat exchanger is comprised of a bayonet-type bundle heat exchanger containing a plurality of concentric tubes having downflowing gas in each inner tube and upflowing gas in the annulus between the concentric tubes.

14. The combination according to claim 12, wherein said heat exchanger includes an upper tubesheet and associated expansion means wherein said upper tubesheet is adapted to suspend from an upper portion of said reactor housing structure.

15. The combination according to claim 12, wherein said upper reactor housing structure includes a circumferentially extending shelf, and wherein said heat exchanger includes an upper tube sheet adapted to suspend from said shelf, whereby expansion means are provided proximate said shelf and tube sheet.

16. A gasification reactor assembly comprised of the following:

(a) a reactor vessel housing structure;

(b) a fluidized bed reaction chamber having an inner periphery;

(c) a means for generating a fluidized bed reaction atmosphere within said reaction chamber, wherein said means is comprised of a floating plenum chamber located proximate said reaction chamber and not fixed to the inner periphery of said reaction chamber, said plenum chamber being floatably seated on refractory material and unattached to any portion of the reactor vessel housing structure to allow for differential thermal expansion;

(d) a means for introducing oxygen into said plenum chamber;

(e) a means for introducing steam into said plenum chamber, said oxygen and steam being premixed within said plenum chamber;

(f) a means for introducing combustible carbon containing material feed into said reaction chamber through the upper portion of said reactor vessel;

(g) a means for removing the resultant product gases and associated particulate matter from within said reaction chamber;

(h) a floating heat exchanger located within said reactor housing structure, wherein said heat exchanger is adapted to allow for differential thermal expansion; and (i) a means for separating said gases from said associated particulate matter and for recycling said particulate matter to said reaction chamber.

17. The combination according to claim 16, wherein said separating means is comprised of a cyclone separator.

18. The combination according to claim 17, wherein said separated particulate matter is recycled to said reaction chamber by way of said means for introducing said source of combustible carbon containing material feed into said reaction chamber.

19. A gasification reactor assembly comprised of the following:

(a) a reactor vessel housing structure with associated insulation means located within;

(b) a fluidized bed reaction chamber having an inner periphery;

(c) a means for introducing combustible carbon containing material feed into said reaction chamber;

(d) a means for generating a fluidized bed reaction atmosphere within said reaction chamber, wherein said means is comprised of a floating plenum chamber located proximate said reaction chamber and not fixed to the inner periphery of said reaction chamber, said plenum chamber being floatably seated on refractory material and unattached to any portion of the reactor vessel housing structure to allow for differential thermal expansion, wherein said floating plenun chamber is located below said reaction chamber and is further comprised of a pair of conically-shaped plates which are integrally connected at their respective outer ends and which include downwardly extending wall members at their respective inner ends, wherein the upper plate includes a plurality of openings and is separated from the lower plate by suitable support means, a perforated conically-shaped plenum grid, which grid slopes downwardly and inwardly to a central withdrawal pipe wherein said plenum grid is connected to said upper plenum plate and both the plenum plate and plenum grid are provided with a plurality of nozzles extending therethrough;

(e) a means for introducing oxygen into said plenum chamber;

(f) a means for introducing saturated steam into said plenum chamber, said oxygen and steam being premixed within said plenum chamber;

(g) a floating bayonet bundle type heat exchanger located within said reactor housing structure, wherein said heat exchanger is located near an upper portion of said reactor housing structure and is adapted for use with the internally-developed high temperature product gases and an external source of lower temperature steam wherein said heat exchanger is further comprised of an upper tube sheet and associated inner tubes, a lower tube sheet and associated outer tubes wherein said upper tube sheet is adapted to suspend from a circumferentially extending shelf located within said upper reactor housing structure, and expansion means which are provided proximate said shelf and upper reactor housing structure; and
(h) a cyclone separator for separating said product gases from said associated particulate matter and for recycling said particulate matter to said reaction chamber by way of said means for introducing said combustible carbon containing material feed into said reaction chamber.

* * * * *